(12) United States Patent
Lee et al.

(10) Patent No.: US 7,072,844 B1
(45) Date of Patent: Jul. 4, 2006

(54) CONFIGURATION INTERVIEW SESSION METHOD FOR THIN CLIENT SIZING TOOL

(75) Inventors: Sharon Marie Lee, Mission Viejo, CA (US); Leonard Eugene Eismann, Rancho Santa Margarita, CA (US); Kathryn Ann McDonald, Yorba Linda, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/813,671

(22) Filed: Mar. 21, 2001

(51) Int. Cl.
*G06F 17/60* (2006.01)

(52) U.S. Cl. .................................... 705/9; 705/4; 705/1
(58) Field of Classification Search ....................... 705/9, 705/11, 4; 709/226, 200, 201; 707/10, 104.1; 717/1; 711/147; 708/142, 145
See application file for complete search history.

(56) References Cited

U.S. PATENT DOCUMENTS 5,182,705 A * 1/1993 Barr et al. .................. 364/401
5,267,181 A * 11/1993 George ....................... 364/709
5,557,515 A * 9/1996 Abbruzzese et al. .... 364/401 R

* cited by examiner

*Primary Examiner*—Pierre E. Elisca
(74) *Attorney, Agent, or Firm*—Alfred W. Kozak; Mark T. Starr; Lise A. Rode (57) ABSTRACT

A series of Window screens are provided with queries to gather customer data for the customer's enterprise operations. Data on site locations, number of users, types of users and Application Programs utilized and their relationships are accumulated into a Configuration Session Database which serves as a foundation of the Customer's Profile which can later be used to configure a suitable design of Server Farms for the customer.

1 Claim, 4 Drawing Sheets

CONFIGURATION INTERVIEW SESSION METHOD FOR THIN CLIENT SIZING TOOL

FIELD OF THE INVENTION

This disclosure involves a method of communicating with a customer and recording information on Window screens in order to ascertain the customer's requirements for types of applications to be used and number of users in order to develop a customer profile which can be stored in a database.

CROSS-REFERENCES TO RELATED APPLICATIONS

This application is related to co-pending applications designated hereinbelow and are all included herein by reference.

U.S. Ser. No. 09/813,667 entitled "THIN CLIENT SIZING TOOL FOR INTERPRISE SERVER FARM SOLUTION CONFIGURATOR";

U.S. Ser. No. 09/813,672 entitled "METAFARM SIZER CONFIGURATION OPTIMIZATION METHOD";

U.S. Ser. No. 09/813,670 entitled "SOLUTION GENERATION METHOD FOR THIN CLIENT SIZING TOOL";

U.S. Ser. No. 09/813,668 entitled "METHOD FOR CALCULATING USER WEIGHTS FOR THIN CLIENT SIZING TOOL";

U.S. Ser. No. 09/813,669 entitled "METHOD FOR CALCULATING MEMORY REQUIREMENTS FOR THIN CLIENT SIZING TOOL";

U.S. Ser. No. 09/443,926 entitled "METHOD FOR ESTIMATING THE AVAILABILITY OF AN OPERATING SERVER FARM";

U.S. Ser. No. 09/474,706 entitled "METHOD FOR SERVER FARM CONFIGURATION OPTIMIZATION";

U.S. Ser. No. 09/705,441 entitled "METHOD FOR SERVER METAFARM CONFIGURATION OPTIMIZATION".

BACKGROUND OF THE INVENTION

Many different types of problem situations are presented to digital designers, proposal makers and configurators of Enterprise systems using Server Farm networks who have the purpose of laying out, designing and configurating computer server facilities.

In order to develop a profile of the particular customer's situation, involving the type of application requirements he may have, the number of maximum users and normal-situation users utilized in the situation, plus the location and types of sites involved for that particular customer, it is necessary to develop the information and to insert and store this information in a Configuration Database.

There have been earlier large and unwieldy attempts in order to develop a customer's profile which were attempted to be used to eventually determine the best enterprise configuration for the particular customer. However, these often involve considerable guesswork and trial-by-error methods.

By using a specific routine which can be laid-out on window screens of a personal computer, it is now possible to present an orderly set of questions and information data developments which will provide a very specific customer profile for meeting the needs of a specific customer or end user.

As will be seen in the presently disclosed application, a series of specific steps involving site information, the quality of Servers and Server Farms to be used, the types of applications, the types of users who are involved, and also the types of reliability, availability and redundancy that may be required by the customer, will all be taken into consideration later by a very specific step-by-step algorithmic method which is applicable to a series of window screens on a designer's personal computer, which will then enable him to develop a specific customer profile which can then be stored in a database designated as the Configuration Session Database.

SUMMARY OF THE INVENTION

A personal computer is used which has a series of windows onto which may be developed a series of questions and responses which will then enable a user to develop a customer profile for the particular customer which can be stored in a Configuration Session database.

The series of windows will lead the person interviewing or communicating with the customer to develop a base of information which will indicate the name, location and the number of users at each locational site. Then, for each site, there is developed a differentiation as to whether this site is a extra-large site or a less-than-large site, in which case different window steps are answered in order to satisfy the types of information that is required.

For the smaller, or more manageable sites, there is entered the features and capabilities of the Server Farm, the Server Farm's primary role and the number of users, followed by information on the types of users which are assigned to each Server Farm.

Subsequently, there are windows used to enter information regarding applications, user types and other parameters, such as disk requirements and memory requirements. Subsequently, there is calculated the amount of disk space required for each user-type which uses any particular given application. Later, this information is all collected and stored as a customer profile in a Configuration Session Database.

BRIEF DESCRIPTION OF THE DRAWINGS

FIG. 1, designated with portions 1A, 1B, 1C, and 1D show a flowchart which indicates the various steps involved in developing a customer profile by the use of garnering certain types of information for each type of window presented in the sizing tool;

GLOSSARY LIST OF RELEVANT ITEMS

1. ADJUSTED USER TOTAL (SERVER FARM): The normalized total number of Users that will be supported by the SERVER FARM. Unadjusted Users are grouped into 4 distinct usage-pattern categories, namely (a) Light, (b) Medium, (c) Heavy, and (d) Super Heavy. Calculations are performed on the number of Users in each grouping to determine the normalized number of Users. These normalized numbers are then summed to establish the ADJUSTED USER TOTAL for the entire SERVER FARM.

2. APPLICATION DELIVERY SOLUTION CONFIGURATOR: This is the Unisys approved and recognized designation of the present method and system as defined by this invention. This is a Windows application that helps one in choosing the best-developed Application Delivery (Thin Client) server solution that will meet a client's requirements.

This Solution Configurator guides one through a customer interview session where information is gathered in order to develop a set of solutions that will match the customer's performance requirements but also provide different availability levels suitable to the customer-client.

3. APPLICATION SERVER: This is the intended use or responsibility of one of the designated server farms. This type of server farm would run computer programs or pieces of software designed to perform specific multi-user tasks solely within the Windows Terminal Server systems making up the server farm. APPLICATION SERVERS would not be dependent on other back-end servers for the processing of data.

4. APPLICATION TYPE: This is one of four main interview categories used by the described Thin Client Sizer Tool for collecting customer information and collecting also Application Type documents involving the memory and the disk resources typically required when running an application. By supplying the Application Types that will be running—helps to size the Server Farm in order to sufficiently handle the client demand.

5. APPINPUT: GUX-based—This requires limited User input such as an application developed with Microsoft Visual Basic where selections are made from lists or by clicking various options. Text-based—Requires considerable typing by the User such as creating a document in Microsoft Word.

6. APPOUTPUT: Text-based—Indicates the kind of information presented by the application. For example, most Visual Basic or C++ windows and dialog boxes, most uses of productivity apps (Microsoft Office), terminal emulation, etc. Graphic-based—Indicates the kind of information presented by the application. For example, desktop publishing large documents with graphics, Web pages with a lot of picture content (JPEG files), scanned images (TIF files), Microsoft Encarta, etc.

7. APPPROCESSING: Light—Indicates the application executing on the terminal server does little more than present a GUI. For example, a Visual Basic application, the SAP thin client, light use of productivity apps (Microsoft Office), terminal emulation, etc. Heavy—Indicates the application executing on the terminal server uses more processor, memory or disk resource usage. For example, the Peoplesoft Thin Client, Outlook Exchange client, heavy use of productivity apps for complex tasks (desktop publishing, large documents with graphics, extremely large spreadsheets with complex cascading calculations, etc.)

8. AVAILABILITY: This is a measure of the readiness of the system and an application to deliver an expected service to the User with a required performance level. It may be described as a percentage of time that a system and an application are running as distinguished from the system being down for maintenance or repairs.

9. AVAILABILITY GOAL: This is the target service level as defined by the client for the server farm. This data value is input to the tool as a percentage of time that the client expects the systems and applications in the server farm to be accessible by all Users.

10. AVAILABILITY LEVEL TAB WINDOW (FIG. 24 OF U.S. Ser. No. 09/813,667): This shows the Availability Calculator which helps to determine solutions that include future/growth potential requirements with a variety of redundancy levels. This screen is interactive and will take input for Adjusted Concurrent number of users, system repair times and redundancy levels. This screen is interactive and will take input for Adjusted Concurrent number of users, system repair times and redundancy levels and returns solution information such as estimated number of servers, # peak users, availability, estimated downtime, # redundant servers and server farm mean time to failure (MTTF).

11. BACKGROUND PROCESSING: The ability of a user-interactive software application to execute processing steps independent of the input and output actions. Background processing would include, but is not limited to, procedures such as 'always on' spell checking in a word processor or 'always on' calculations in a spreadsheet.

12. BENCHMARK: This is test of computer performance and consists of a test or set of tests used to measure the performance of an individual e-Action ES Terminal Server. The output from these tests consists of a value designated as the total number of Users that each e-Action ES Terminal Server system can reasonably sustain and process.

13. BASE SOLUTIONS TAB WINDOW (FIG. 23 U.S. Ser. No. 09/813,667): Reports the minimum server configuration recommendation (i.e., not including additional redundancy or growth considerations) for each of the customer Site's server farms. A base solution includes the minimum number of servers and GB RAM required with regard to the Operating system, # processors and MHz available for each server type supported by Unisys.

14. CITRIX METAFRAME: This is computer software from Citrix Systems, Inc., headquartered in Ft. Lauderdale, Fla. This METAFRAME software is loaded onto each Windows Terminal Server and provides superior enterprise-level management and control functions for the e-®ction Enterprise Servers.

15. CITRIX METAFRAME ADD-ONS: ICA Secure and Load Balancing Services are two optional computer softwares that can be run simultaneously with CITRIX METAFRAME on a Terminal Server. ICA Secure provides enhanced network security for METAFRAME. Load Balancing Services allow Citrix MetaFrame to distribute application processing to the plurality of computer systems in a server farm.

16. CONCURRENT USERS: This number is an estimate of the maximum number of users simultaneously processing applications on a Server Farm at any given time. This is characteristically a percentage of the total Benchmark users that can be sustained on all of the e-®ction Enterprise Servers in the Server Farm.

17. CONFIGURATION DATABASE TEMPLATE: This is a collection of data on a computer applied during the information collection process and utilized for the assembly of information collected from window screens.

18. CONFIGURATION SESSION: This is the vehicle used by the described Thin Client Sizer Tool to collect the information on a customer's sizing requirements and to generate the best solution to meet those requirements.

19. CONFIGURATION SESSION DATABASE: This is a collection of data on a computer used for providing information to an instance of the Application Delivery Solution Configurator that enables algorithmic steps and calculations to be applied in the development of an optimized configuration for the Server Farm.

20. CONFIGURATOR: See APPLICATION DELIVERY SOLUTION CONFIGURATOR.

21. CUSTOMER DATA TAB WINDOW (FIG. 22 OF U.S. Ser. No. 09/813,667): Reports back to the customer the information that was collected during the interview session and that which the solution generation was based on.

22. CUSTOMER PROFILE: This is a collection of data describing the customer's characteristics and attributes and assembled from the customer interview. This data is input to an algorithm which will output a configuration solution for that particular User or customer.

23. DEFAULT AVAILABILITY: The four (4) SERVER FARM initial availability level scenarios as calculated and displayed by the AVAILABILITY CALCULATOR. The availability levels for the Server Farm are calculated based on the following three parameters: (1) the number of adjusted concurrent users, (2) the system repair time, and (3) the REDUNDANCY FACTOR. For the four DEFAULT AVAILABILITY levels, the first parameter is calculated based on the sizing of the SERVER FARM, and the latter two parameters have pre-configured values, as chosen by the Engineering Group, where the second parameter is held constant at 6 hours and the second parameter is varied from 25% to 10% in decrements of 5%.

24. DISK CAPACITY TAB WINDOW (FIG. 27 OF U.S. Ser. No. 09/813,667): Reports on the disk capacity requirements determined by the interview session input and solution generation algorithms for each of the customer Site's Server Farms.

25. DOWNTIME: The downtime or repair time for a single application server is the time interval required to restore the server and system back to normal business operation. At the end of the repair period, the applications running on the repaired server are available to Users. The downtime for a Server Farm is the time interval required to restore the nominal Server Farm performance.

26. e-®TION ENTERPRISE SERVER (ES): This is the specific name for a plurality of server models marketed and sold by Unisys Corporation. Current models include ES7000, ES5000, and ES2000 systems.

27. ESTIMATOR PROGRAM: This is a program which performs method steps for estimating system parameters such as the availability of an application program to run on any computer or server in the cluster of at least two servers or computers. This type of estimator program was the subject of a co-pending application U.S. Ser. No. 550,603 which is incorporated herein by reference. Another estimator program is the subject of this patent application.

28. ETO: This represents engineering technology optimization and involves an organization located at a specific company location that is devoted to optimizing the performance of the Enterprise-class Windows NT Server platforms.

29. FAILOVER: This is a mode of operation in the system which has two or more servers or computers wherein a failure in one of the servers or computers will result in transfer of operations to the other or another one of the still operating servers and computers. Failover time is the period of time required for successful transfer from a failed server to an operative server.

30. INPUT CHARACTERISTICS: These attributes describe how input is provided to the customer's software applications—through textural typing, through GUI based screen manipulation, or through a combination of both methods.

31. KBPS REQUIREMENTS (SERVER FARM): This is the total data transmission capacity (or bandwidth), measured in kilobytes per second (Kbps), which will be needed for all bi-directional communication between the Users' concurrent connections and the SERVER FARM(s).

32. MB (MEGABYTE): A unit of computer memory or disk storage space equal to 1,048,576 bytes.

33. MEAN TIME TO FAILURE (MTTF): This is the average operating time between two failures, that can be estimated as the total operating time divided by the number of failures.

34. MEAN TIME TO REPAIR (MTTR): This is the average "downtime" in case of failure, that can be estimated as the total downtime divided by the number of failures.

35. MEMORY REQUIREMENTS: This is the necessary amount of server memory used by each User's instance of the multi-user software application.

36. NETWORK CAPACITY TAB WINDOW (FIG. 26 OF U.S. Ser. No. 09/813,667): This is called Network Utilization now; reports on the estimated network activity measured in Kbps for each of the customer Site's Server Farms.

37. OUTPUT CHARACTERISTICS: These attributes describe how output is derived from the customer's software applications—through the display of visual information as text, as graphics, as animated graphics, or as a combination of one or more methods.

38. OPTIMIZATION CRITERION: This is a function that determines the value of one of the essential system attributes and must be minimized (or maximized) by variation of one or more system parameters that are chosen as OPTIMIZATION PARAMETERS. Each optimization parameter should have a predefined domain that defines the values that the optimization parameter may assume. The OPTIMIZATION CRITERION is a focus of an optimum system design or configuration. The examples of the optimization criteria are system performance, system availability, and cost of ownership.

39. OPTIONAL SOFTWARE TAB WINDOW (FIG. 25 OF U.S. Ser. No. 09/813,667): Reports on the additional features/capabilities entered in the interview session regarding the customer's profile for each of the Site's Server Farms. Optional software requirements include such categories as Client Connection Methods, Enhancements, Environment support, Multimedia capabilities, Display characteristics, Protocol support, and Server Enhancements.

40. PROCESSING CHARACTERISTIC: This attribute describes whether the customer's software application performs extensive BACKGROUND PROCESSING, independent from the processing of application input and output.

41. REDUNDANCY FACTOR (Rf): This is a measure of the additional number of Users that can be added to the nominal number of Users per server without exceeding the maximum number of Users per server (server performance benchmark maximum of Users). It is a difference between maximum and nominal performance as a percentage of the maximum performance. The Redundancy Factor can be calculated as 100 percent minus a usage factor Uf.

42. SERVER CONFIGURATION REPORT: This is a report generated by the Thin Client Sizer Tool that will contain the information on the optimum server configurations as determined by the customer information which was collected during the Configuration Session and the performance benchmarking results.

43. SERVER FARM: This is one of the five main interview categories used by the Thin Client Sizer Tool for collecting customer information. A Server Farm consists of one or more Windows Terminal Servers configured together for unified administration, security, and for communication services. For instance, two Server Farms might be required for certain applications such as the PeopleSoft clients, or one server for a Payroll function, and another server for a Human Resources function.

44. SERVER FARM AVAILABILITY CALCULATOR: This is an estimator program that estimates the availability for the Server Farm.

45. SERVER FARM OVERFLOW: The condition whereby the results of calculations on the number of servers in a SERVER FARM, during the Solution Generation phase, exceeds the maximum number of servers recommended for a SERVER FARM as determined by the Engineering Group.

46. SERVER INFORMATION DATABASE: This is a collection of data on a computer for holding benchmark and informational data on a plurality of Unisys Enterprise Server systems. This data is used by the Thin Client Sizing Tool in determining the optimum server farm configuration to meet the customer's sizing requirements.

47. SITE: This is one of the five main interview categories used by the Thin Client Sizer Tool for collecting customer information. A Site is the physical location where the Windows Terminal Servers will be located in particular cities such as, New York, Los Angeles or Chicago, etc. and the number of users at that physical location.

48. SITE/SERVER FARM PAIR: This is a defined combination of a specific Server Farm residing within a particular physical location. As defined during the customer interview, each physical location, or site, can contain one of more Server Farms. When defining the User and Application characteristics of each Server Farm within the site, each individual combination is considered as an independent pair.

49. SIZING DATABASE: This is a collection of data on a computer output from the THIN CLIENT SEVER FARM AVAILABILITY CALCULATOR and used for storing the number of e-®ction Enterprise Server unit modules and their availability levels.

50. SOLUTION CONFIGURATOR: See APPLICATION DELIVERY SOLUTION CONFIGURATOR.

51. SOLUTION GENERATION: The act of producing a particular SERVER FARM configuration (i.e. the SOLUTION) that will meet the sizing and availability requirements of a client. This SOLUTION will be comprised of an appropriate number of servers, proper disk space and memory to meet the client requirements.

52. THIN CLIENT SERVER FARM AVAILABILITY CALCULATOR: This is one of the examples of the SERVER FARM AVAILABILITY CALCULATOR. Because Thin Client configurations are intended to make applications available to multiple Users at the same time, this calculator calculates the availability of a specified number of instances of an application (not just a single instance) where each application instance is being run at the server, but all the User input response is taking place at the client terminal. In this scenario, downtime occurs whenever the number of available instances of the application drops below the required specified number of instances.

53. UCON32: This is the unit designated as the Unisys Configurator which is an extensive on-line configuration tool which is used to support all Unisys Corporation system platforms.

54. USAGE FACTOR (Uf): This is the ratio of the nominal number of Users per server to the maximum number of Users per server (server performance benchmark maximum of Users) times 100 percent.

55. USER-TYPE: This is one of the five main interview categories used by the Thin Client Sizer Tool for collecting customer information. A User-Type embodies the usage patterns of a particular group of Users. User usage patterns will have a significant impact on performance. The area which is considered here is the user's typing speed. Some examples of User-types are, order entry clerks, secretaries, developers, and technical writers.

56. USER WEIGHT: This is the estimated average user impact (light, medium, heavy or super heavy) on the Windows Terminal Server, and a value is assigned to each User Type by the sizing tool. Such User attributes as typing speed or application familiarity can all affect this parameter. It is used to approximate the amount of server processor usage that is imposed by the different User Types.

57. WINDOWS TERMINAL SERVER: This is the designation for an e-®action Enterprise Server that is running one of two operating systems sold and supported by Microsoft Corporation: (1) Windows NT Server 4.0, Terminal Server Edition, or (2) Windows 2000 (Server, Advanced Server, or Datacenter Server) with the optional Terminal Services service enabled in Application Server mode.

DESCRIPTION OF PREFERRED EMBODIMENT

Figure 2:
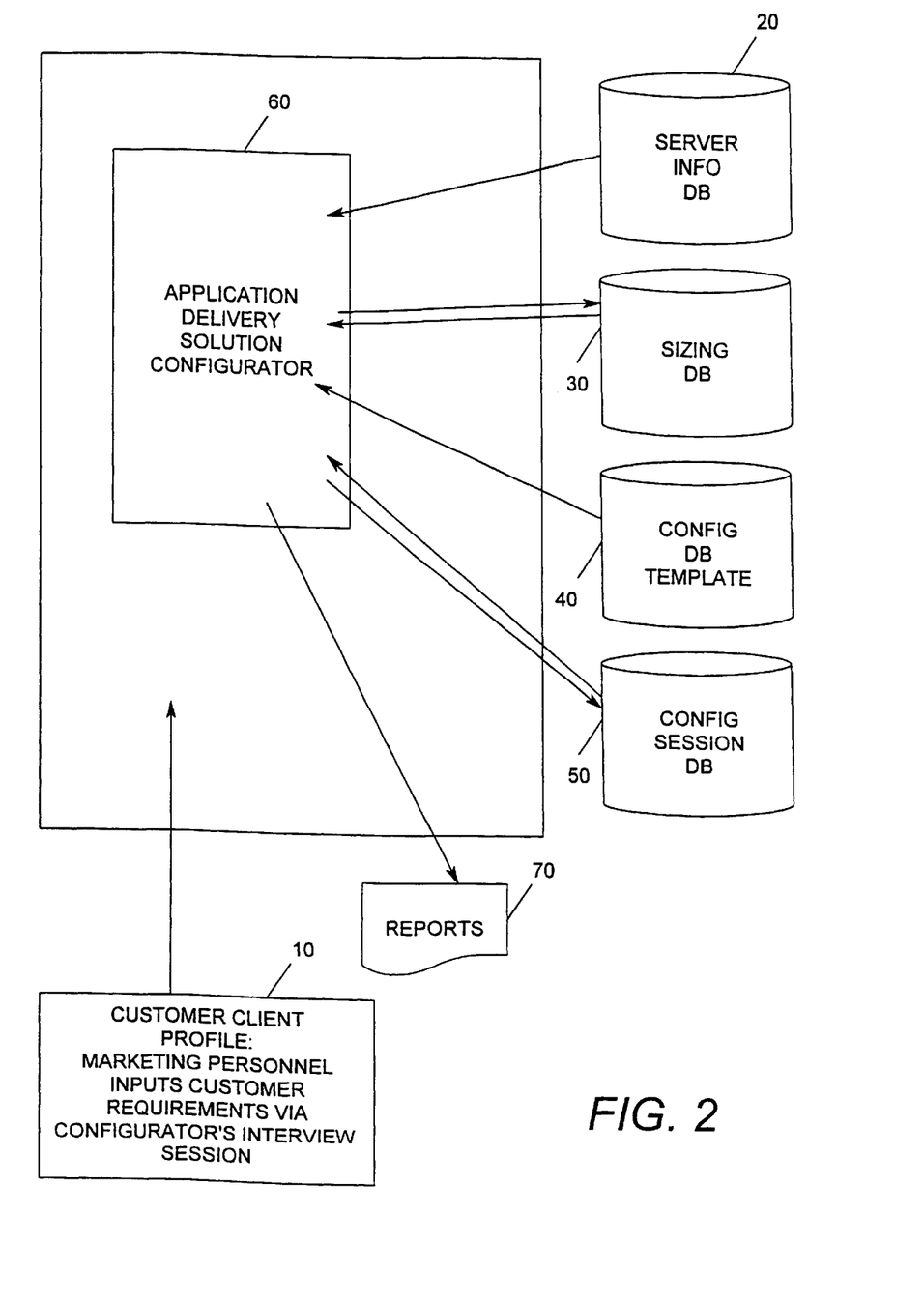
FIG. 2 is a general drawing showing the overall system configuration for the Thin Client Sizing Tool.

FIG. 2 is an environmental drawing to illustrate the basic modular arrangement involved in the present application delivery solution configurator 60. The data accumulation and customer-client information is indicated as being developed at the customer-client profile block 10. The methods and algorithmic steps are provided for by the block designated Application Delivery Solution Configurator 60.

Also available for input to the configuration program 60 is the server information database 20 and the configuration database template 40. Then additionally collected for two-way information transmission is the sizing database 30 and the configuration session database 50.

Thus, the customer-client profile information 10 and other applicable information residing in the databases 20, 30, 40 and 50, are attached for inter-working with the Application Delivery Solution Configurator 60, after which when all the subsequent algorithmic steps are effectuated, then there will be a reports unit 70 in which the optimum solution information is provided to the designer and to the client-customer for providing an optimized solution for the customer's enterprise or operating situation.

As was indicated in the co-pending companion application, U.S. Ser. No. 09/813,667 entitled "THIN CLIENT SIZING TOOL FOR ENTERPRISE SERVER FARM SOLUTION CONFIGURATOR", a number of Windows were illustrated which were used to develop and furnish data to the drawings of FIGS. 3-28, which have illustrated the various windows into which the organized set of informational data have been input.

Figure 1A:
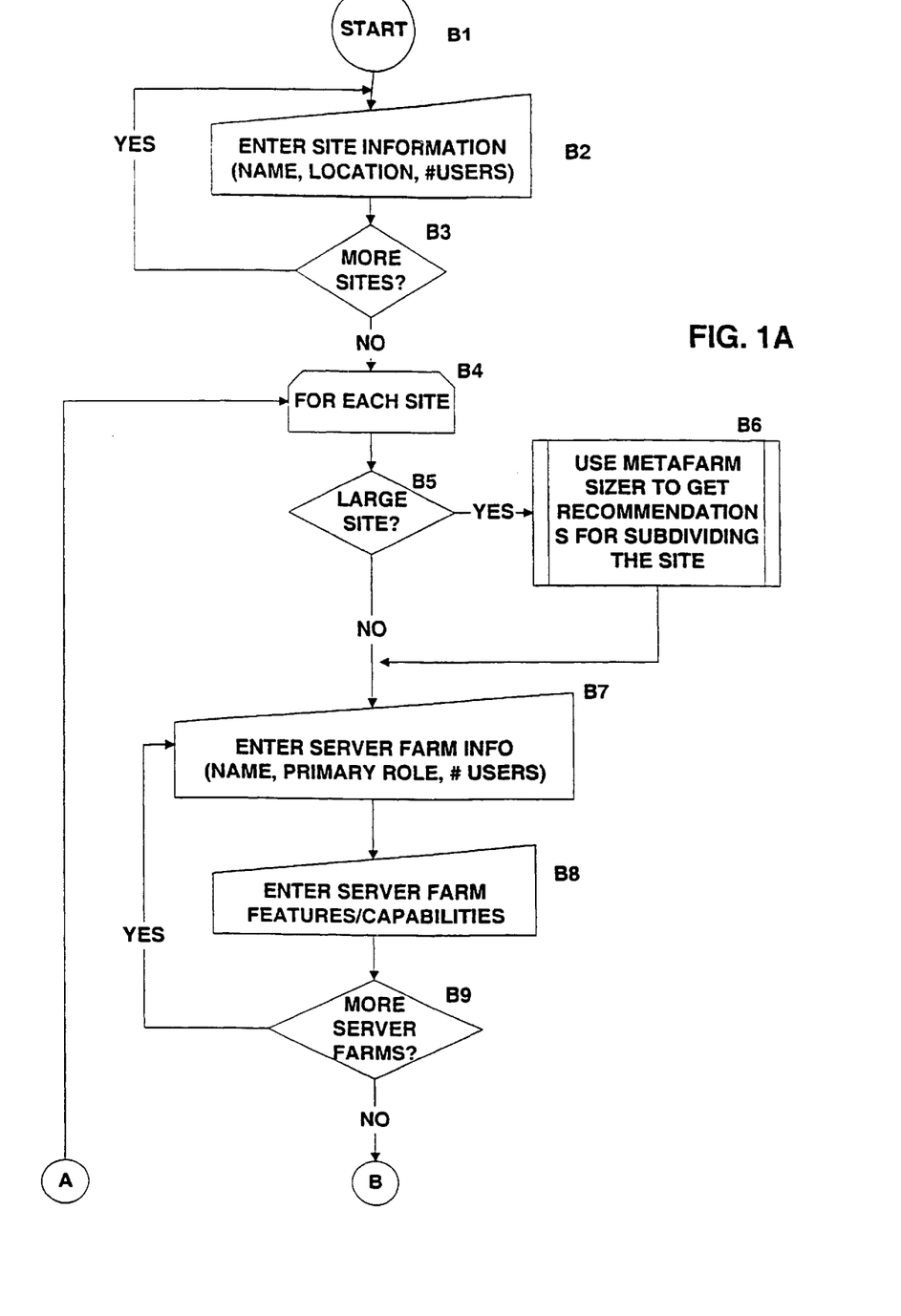
Figure 1B:
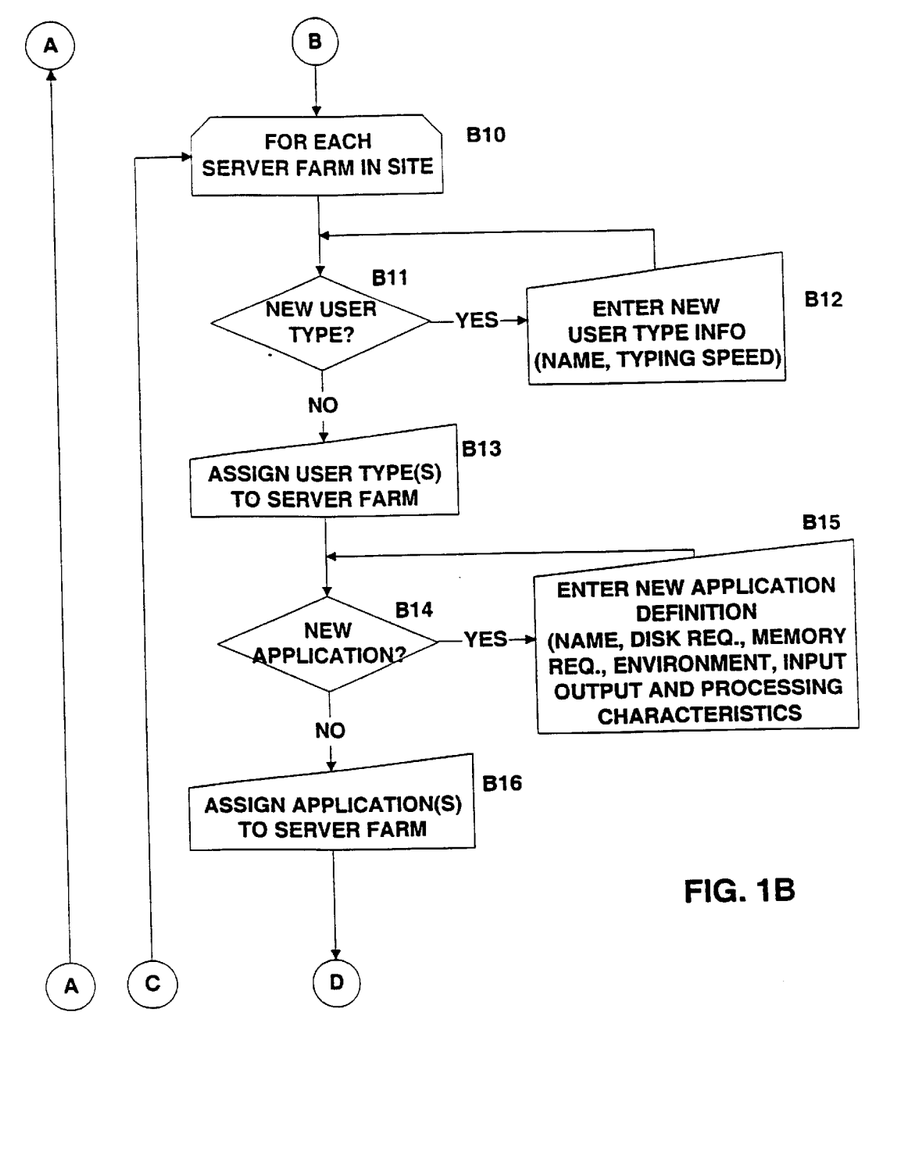
Figure 1C:
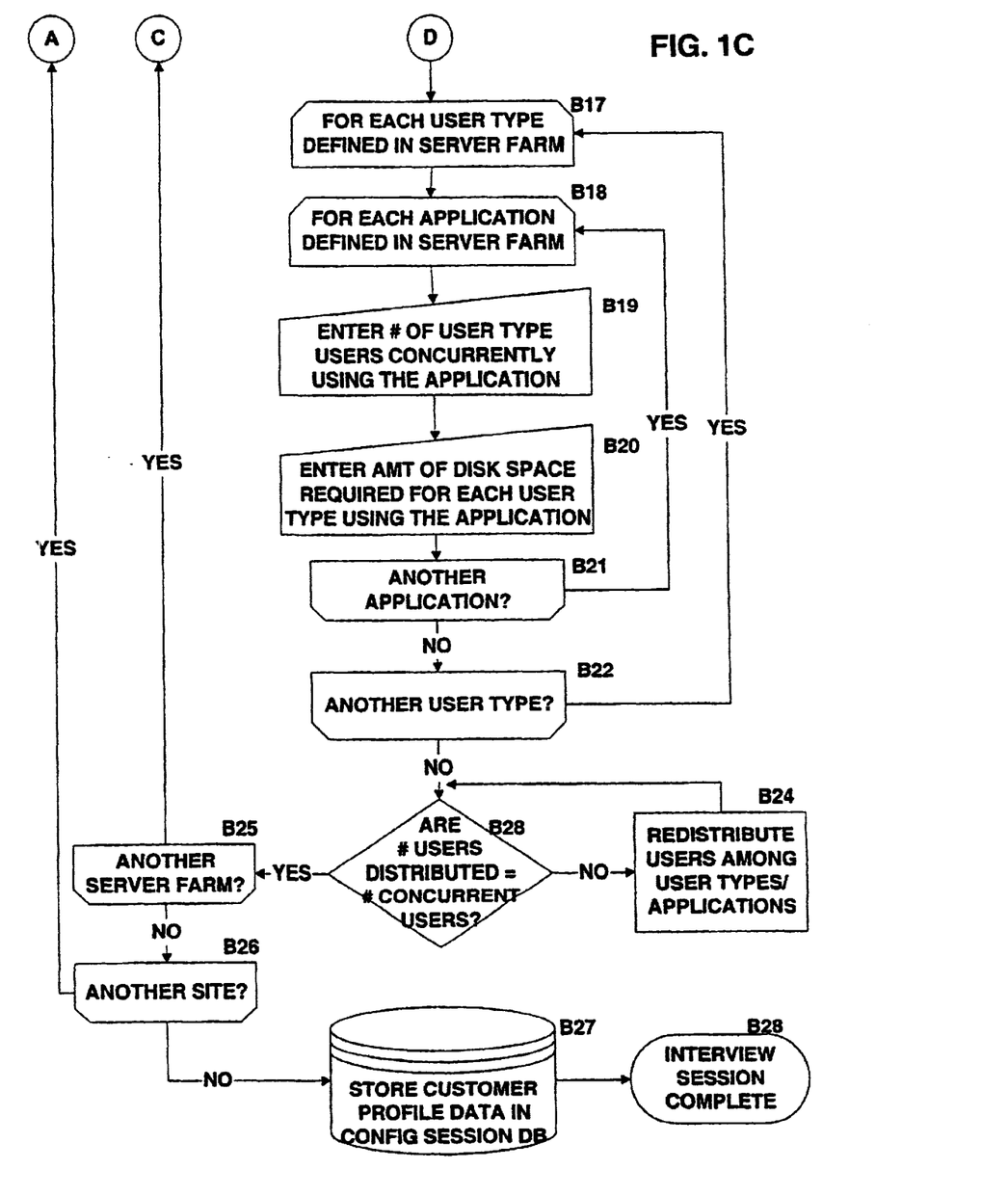

FIG. 1 which is laid out as FIGS. 1A, 1B, 1C, of the present application illustrates the algorithmic flowchart by which the various windows indicated in FIGS. 3-28 (of U.S. Ser. No. 09/813,667) can be used to develop the information shown in each of the method steps of FIG. 1.

As will be noted in FIG. 1, these steps are given a set of step numbers starting from B1 through B28, and will be described hereinbelow.

In the illustration of the various steps of FIG. 1, it will be noted that occasionally a specific set of numbers are used in order to better illustrate the elements of the system that is being developed. Table I hereinbelow shows a bird's-eye view of the Customer Profile for this example.

TABLE I

Birds Eye View:
Site: Customer 2K (2000 total users)

| | |
|---|---|
| Farm (1): | Manufacturing (800 concurrent users) |
| | 400 Developers use Microsoft (MS) Internet Explorer needing 200 MB disk. |
| | 100 Testers use MS Internet Explorer needing 25 MB disk. |
| | 300 Testers use IOCooker needing 100 MB disk. |
| Farm (2): | Engineering (650 concurrent users) |
| | 300 Developers use an Attachmate terminal emulator needing 30 MB disk. |
| | 200 Developers use MS Internet Explorer needing 20 MB disk. |
| | 100 Developers use MS Access 97 needing 10 MB disk. |
| | 50 Developers use IOCooker needing 5 MB disk. |

A new customer configuration interview session is started (B1) to determine a solution for a small customer with one site, for example, containing 2000 users.

The marketing/interview personnel would then enter "Customer 2K" at the site name, "Anytown, USA" as the location and 2000 as the number of users (B2) in the Site component of the interview session. Since there is only one site, the decision block "More Sites?" (B3) is answered with "NO".

For the Site entered at step (B4), the site of this example is not considered large (which would be more than 10,000 users) so "NO" is the answer to the decision block "Large Site?" at step (B5). If the answer here was "YES", then a recommendation for subdividing the site at step (B6) would be requested as described in the co-pending U.S. Ser. No. 09/813,672 entitled "METAFARM SIZER CONFIGURATION METHOD".

In the present illustrative example, one Server Farm is defined as (1) "Manufacturing" with a primary role of "Other" and 800 concurrent users (B7). The features and capabilities are entered for the Farm at step (B8).

The "More Server Farms?" decision block at step (B9) is answered with "YES" in this example and a second Server Farm is defined as of Farm (2) "Engineering" having a primary role of an Application Server with 650 concurrent users at step (B7). Features and capabilities required for the Servers are added for the Farm at step (B8). This time, the "More Server Farms?" decision block question (B9) is answered with "No". The Customer 2K Site is now defined with 2000 total users and the two Server Farms 1 and 2 are defined to serve a total of 1450 users concurrently, i.e., 725 concurrent users for each Server Farm.

For the first Server Farm defined and called "Manufacturing" in step (B0), a new User Type is required which provides a "YES" at step B11 and is defined as "Testers" with the level of "slow" typing speed at step (B12). No more new User Types are required, thus now the New User Type decision block query is "NO" at step B11.

The Farm example here is assigned two types of users: (i) Developers (a type that exists in the configurator's pre-defined list of User-Types with insignificant typing speeds) and the new type, (ii) Testers (B13).

The decision block question "New Applications?" is answered with "YES" (B14) and a new application is defined here at step (B15) named "IOCooker" using a pre-defined 20 MB of disk space and 2 MB's of memory. The "IOCooker" application is further defined to make use of a 32-bit environment, text based input and output (I/O) and heavy background processing. Since no more new applications are defined, then the decision block question on "New Application?" is "NO" at step B14. The new IOCooker and Internet Explorer 5.0 (an application that exists in the configurator's pre-defined list of Application Types) are assigned to the Server Farm at step (B16). The Internet Explorer 5.0 has been pre-defined to need 70 MB disk space, 12 MB memory, a 32-bit environment with text based I/O and "light" background processing.

For each User Type at step (B17), and each Application type in the Server Farm at step (B18), the User is required to distribute the appropriate portion of the Server Farm's 800 concurrent Users. Starting with the Developer's user type, say that 400 users are estimated to be concurrently working with Internet Explorer at step (B19) and they require an additional 200 MB's of working disk space at step (B20). The question block "Another Application?" at step (B21) is answered with "YES" and the next application, IOCooker, is considered at step (B18) with respect to Developers. No developers are users the of IOCooker Application (B19), therefore, no additional Disk Space is required (B20). The question block "Another Application?" at step (B21) is answered "NO" this time and the Application loop (B18–B21) is exited and "Another User Type?" question block is asked at step (B22) and answered "YES" bringing the flow sequence back up to step (B17).

The next User Type at step (B17) of Testers (user type ii) is considered with each Application type at step (B18) as assigned to the Server Farm. The remaining 500 concurrent users require distribution among the User/Application pairs. The first Application Type (B18), Internet Explorer, is estimated to be used concurrently by 100 Testers (B19), requiring an additional 25 MB's of working disk space (B20). The question block "Another Application?" is answered "YES" at step (B21) returning flow sequence to (B17). The 300 Testers are estimated to be using the IOCooker Application concurrently (B19) and require 100 MB additional working disk space (B20). There are no more Applications involved ("NO" at B21) and no more User Types involved ("NO" at B22) left to consider.

The decision block question is then asked "Are the numbers of users distributed in Loop B23–B24 equal to the number of concurrent users defined for the Server Farm at B23. If the answer is "NO", then the User is required to redistribute all of the concurrent users among the User Type/Application combination pairs (B24) so that all the concurrent users are covered by a User Type/Application combination. If the answer is "YES" at step B23, the distributed number of users is the same as the concurrent users assigned to the Server Farm, (as it is in this example), and the flow sequence continues to (B25) where "Another Server Farm?" is answered with a "YES" (B25) and the loop is now reiterated (at step B10).

At this point, the Site Customer 2K is defined with two Server Farms, (1) Manufacturing (800 users) and (2) Engineering (1500 users). The Manufacturing Server Farm has 400 Developers and 100 Testers using Internet Explorer and 300 Testers using IOCooker, as per Table I.

Table I assumes the applications are all in the configurator's pre-defined Application list with the exception of the IO Cooker which was user-defined and whose attributes were stored when assigned during the Manufacturing (1) Server Farm loop. The Attachmate installation needs 35 MB disk space, plus 8 MB memory, and involves a 32-bit environment, GUI-based input, text-based output and "light" background processing. Access 97 needs 40 MB disk space, 8 MB memory, and involves a 32-bit environment, GUI-based input, Text-based output and "heavy" background processing. This information is relevant when determining a solution.

When the information for the Engineering (2) Server Farm is entered, the decision block question "Another Server Farm?" at step (B25) is answered "NO" leading to the "Another Site?" question block (B26) which is also answered "NO".

The interview is now completed (B27) information stored in the Configuration Session Database, 50. The Solution Generation described in co-pending U.S. Ser. No. 09/813,670, can now begin with the following customer profile:

Site: Customer 2K (200 total users)
    Farm: Manufacturing (800 concurrent users)
        400 Developers use Internet Explorer needing 200 MB disk ea.
        100 Testers use Internet Explorer needing 2 MB disk ea
        300 Testers use IOCooker needing 1 MB disk ea.
    Farm: Engineering (650 concurrent users)
        300 Developers use Attachmate Terminal Emulator needing 30 MB disk
        200 Developers use Internet Explorer needing 20 MB disk
        100 Developers use Access 97 needing 10 MB disk
        50 Developers use IOCooker needing 5 MB disk.

Described herein as been a method for developing a specialized customer profile by supplying answers to queries on a Windows screen. Thus, site locations, applications involved, user types, server parameters, Server Farm parameters, disk and memory requirements are recorded into a Configuration Database which will specify the particular profile for the selected customer.

While one embodiment of the invention has been described, there may be other variations which can be developed but which are still encompassed by the attached claims.

What is claimed is:

1. A method for developing a customer profile of data in aid of subsequently utilizing a Thin Client Sizing Tool to develop an optimized Server Farm configuration for the customer, comprising the steps of:
    (a) utilizing a series of computer Windows to record (i) name of each Server Farm site, (ii) location of each Server Farm site, and (iii) number of Users involved at each Server Farm site;
    (b) establishing a number of Server Farms required at each site according to the number of Users involved at each site;
    (c) recording a number of concurrent Users for each Server Farm and entering data on each Server Farm's features and capabilities;
    (d) calculating special parameters required for each Server Farm at each locational site including the steps of:
        (di) recording any newly-added User-Types by name;
        (dii) establishing a typing speed involved for each of said newly-added User-Types;
    (e) storing said customer profile data in a configuration session database which operates in conjunction with an Application Solution Delivery Configurator program to provide an optimal Server Farm configuration.

\* \* \* \* \*